United States Patent
Koshi et al.

(10) Patent No.: US 6,257,482 B1
(45) Date of Patent: Jul. 10, 2001

(54) JET SOLDER FEEDING DEVICE AND SOLDERING METHOD

(75) Inventors: Masuo Koshi, Ikoma; Tadahiko Sugimoto, Kadoma; Hiroaki Nakayama, Neyagawa; Kenichirou Todoroki, Hirakata, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/575,986

(22) Filed: May 23, 2000

(30) Foreign Application Priority Data

May 27, 1999 (JP) .................................... 11-147388
Apr. 25, 2000 (JP) .................................... 12-123391

(51) Int. Cl.[7] .............. H05K 3/34; B23K 1/08; B23K 3/06
(52) U.S. Cl. .................. 228/260; 228/261; 228/6.2; 228/37
(58) Field of Search .................. 228/178, 179.1, 228/180.1, 256, 260, 261, 33, 36, 37, 262, 258, 180.21, 6.1, 6.2, 31

(56) References Cited

U.S. PATENT DOCUMENTS 5,192,582 * 3/1993 Leidke et al. .................. 228/206
5,779,971 * 7/1998 Pan et al. .................. 266/237

FOREIGN PATENT DOCUMENTS

40435619 * 5/1998 (JP) .

* cited by examiner

Primary Examiner—Tom Dunn
Assistant Examiner—Colleen Cooks
(74) Attorney, Agent, or Firm—Parkhurst & Wendel, L.L.P

(57) ABSTRACT

A jet solder feeding device allowing the molten solder ejected from ejecting ports to be kept at a desired height in a stable manner. The molten solder is ejected and fed from multiple ejecting ports formed on a corrugated plate, each wall portion surrounding the multiple ejecting ports formed on the corrugated plate is projected upward by coining or extrusion. This configuration allows the molten solder introduced under the corrugated plate to be satisfactorily guided by the conically shaped wall portion which surrounds each ejecting port and projected upward. Thus the molten solder ejected from the ejecting ports can be kept at a desired height, and in addition, its state is satisfactorily maintained in a stable manner.

4 Claims, 5 Drawing Sheets

JET SOLDER FEEDING DEVICE AND SOLDERING METHOD

Field of the Invention

The present invention relates to a jet solder feeding device for feeding molten solder to a substrate by ejecting the molten solder from ejecting ports, and to a method for soldering the same.

BACKGROUND OF THE INVENTION

Jet solder feeding devices are already known in which soldering is carried out for a substrate having surface mounted parts and discrete parts (parts with lead legs) consolidated thereon by feeding molten solder ejected from jet nozzles to the substrate while letting the substrate being conveyed.

Jet solder feeding devices of this type include the one which comprises: a first jet nozzle 1 for feeding molten solder satisfactorily to a substrate P mounted with electronic parts in the whole area of the surface to be soldered and a second jet nozzle 2 for removing excess molten solder having been fed to the substrate P, as shown in FIGS. 3 and 4. The first jet nozzle 1 and the second jet nozzle 2 are connected to a duct 3 for the first nozzle and a duct 4 for the second nozzle, respectively, both of which are soaked in molten solder accumulated in a solder melting bath 5. This jet solder feeding device is designed to eject molten solder from the first jet nozzle 1 and the second jet nozzle 2 toward a substrate-conveying path 10 by rotationally driving jet impellers 6 and 7 arranged to face each of the openings at one end of the duct 3 and at one end of the duct 4, respectively.

On the upper end portion of the first jet nozzle 1, a corrugated plate 9 with multiple open ejecting ports 8 is mounted. As shown in FIGS. 5a and 5b, the ejecting ports 8 have the same bore diameter and the same round shape and are provided, for example, in three rows in the direction B perpendicular to the direction A in which the substrate P is conveyed: ejecting ports 8A in an upstream row, ejecting ports 8B in an intermediate row and ejecting ports 8C in a downstream row, and all the ejecting ports 8 are formed in different locations relative to the direction B perpendicular to the direction A in which the substrate P is conveyed. Each of the wall portions surrounding each ejecting port 8 on the corrugated plate 9 is designed to be flat.

The substrate P warps to some degree when heated by the molten solder, and when piles of molten solder ejected from ejecting ports 8A become low, portions are created on the surface of the substrate P or the electronic parts intended to be soldered which the molten solder will not come in contact with. This causes poor wetting.

One of the conventional techniques to possibly deal with this problem is such that the piles of the molten solder are made higher by increasing the number of revolutions of the jet impellers 6 and 7.

In the above described conventional jet solder feeding device, however, although the average height, on a time basis, of the piles of the molten solder becomes higher by increasing the rpm of the jet impellers 6 and 7, the height is very unstable since it varies with time. Accordingly, when the piles of molten solder ejected from ejecting ports 8 temporarily become low, portions may be created on the surface of the substrate P or the electronic parts intended to be soldered which the molten solder will not come in contact with; consequently, poor wetting is caused in some part of the substrate.

There is an alternative in which ejecting pressure is increased by decreasing the bore diameter of each ejecting port 8. In this case, however, since the cross-sectional area of the ejection from each ejecting port 8 becomes smaller, the area of the contact surface of the substrate P also becomes smaller, and there is still a possibility of causing poor wetting.

The present invention has been made to solve the above problem. Accordingly, the object of the present invention is to provide a jet solder feeding device and a method for soldering which make it possible to keep the molten solder ejected from ejecting ports at a desired height in a more stable manner.

SUMMARY OF THE INVENTION

In order to solve the above problem, the present invention is a jet solder feeding device for feeding molten solder to a substrate by ejecting the molten solder from multiple ejecting ports formed on a corrugated plate, in which each wall portion surrounding each ejecting port on the corrugated plate is designed to project upward forming a conical surface.

According to this configuration, the molten solder ejected from ejecting ports can be kept at a desired height in a stable manner.

The invention according to a first embodiment is a jet solder feeding device for feeding molten solder to a substrate by ejecting the molten solder from multiple ejecting ports formed on a corrugated plate, wherein a wall portion surrounding each ejecting port on the corrugated plate is projected upward the walls forming a conical surface.

According to this configuration, molten solder introduced under a corrugated plate is satisfactorily guided by the wall portion which surrounds each ejecting port and is projected upward; accordingly, the molten solder ejected from the ejecting ports can be kept at a desired height, in addition, its state is satisfactorily maintained in a stable manner.

The invention according to a second embodiment is the jet solder feeding device, wherein the wall portion surrounding each ejecting port and being projected upward is formed by extrusion.

According to this configuration, projecting upward the wall portion surrounding each ejecting port can be achieved easily, and the production cost can be held lower.

The invention according to a third embodiment is the jet solder feeding device, wherein the jet solder feeding device comprises a first nozzle for feeding molten solder to a substrate and a second nozzle for removing excess solder having been fed to the substrate, and the ejecting ports are provided on the first nozzle.

According to this configuration, molten solder can be satisfactorily fed to a substrate from the multiple ejecting ports provided on the first nozzle.

A method for using the device includes soldering a substrate by ejecting molten solder from multiple ejecting ports formed on a corrugated plate to feed the molten solder to the substrate, wherein a wall portion surrounding each ejecting port on the corrugated plate is projected upward, whereby soldering is carried out for a part to be connected on the substrate with the molten solder ejected from each of the above described ejecting ports.

According to this method, molten solder introduced under a corrugated plate is satisfactorily guided by the wall portions surrounding each ejecting port and being projected upward; accordingly, the molten solder ejected from the ejecting ports can be kept at a desired height, in addition, its state is satisfactorily maintained in a stable manner. Thus soldering is satisfactorily achieved for the substrate conveyed above the corrugated plate.

DESCRIPTION OF THE EMBODIMENTS

The embodiments of the present invention will be described with reference to FIGS. 1 to 2.

Figure 1A:
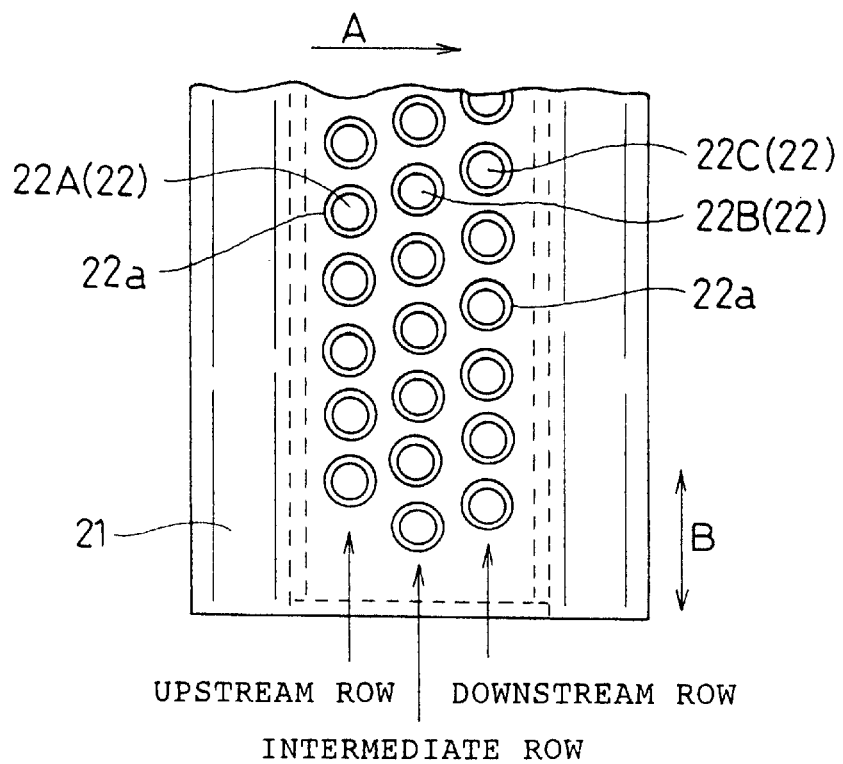
FIGS. 1a and 1b are views in top and in front elevation in section, respectively, partly broken away to show the main part of a jet solder feeding device according to a first embodiment of the present invention.
Figure 1B:
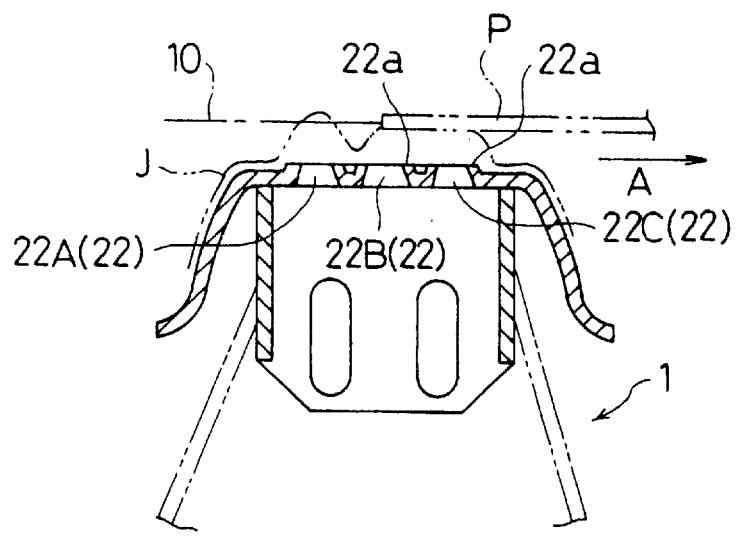

Referring first to FIGS. 1a and 1b, there is shown a main part of a jet solder feeding device according to a first embodiment of the present invention, the jet solder feeding device including a corrugated plate 21 mounted on the upper end portion of a first jet nozzle 1 and having multiple ejecting ports 22 formed thereon. A substrate P subjected to soldering is mounted with discrete parts and it has a surface with relatively small unevenness (not shown in the figures). The direction A in which the substrate P is conveyed is designed to be almost horizontal, and corresponding to this, the portion of the corrugated plate 21 mounted on the upper end portion of the first jet nozzle 1 of the jet solder feeding device on which multiple ejecting ports 22 are provided, is arranged almost horizontally to the substrate-conveying direction A.

These ejecting ports 22 are all designed to have the same bore diameter and the same round shape, are provided, for example, in three rows in the direction B perpendicular to the direction A in which the substrate P is conveyed: ejecting ports 22A in an upstream row, ejecting ports 22B in an intermediate row and ejecting ports 22C in a downstream row, and are formed in such a manner that the ejecting ports 22 are in different locations relative to the direction B perpendicular to the direction A in which the substrate P is conveyed.

And the wall portions 22a surrounding each ejecting port 22 on the corrugated plate 21 are designed to project upward and are formed by coining or extrusion.

According to the above configuration, since the wall portions 22a surrounding each ejecting port 22 are projected upward forming a conical surface, molten solder introduced under the corrugated plate is satisfactorily guided by the wall portions 22a surrounding each ejecting port 22 and projected upward; accordingly, the molten solder ejected from the ejecting ports 22 can be kept at a desired height, in addition, its state is satisfactorily maintained in a stable manner. Thus, even when position fluctuations occur on the surface of the substrate P or the electronic parts subjected to soldering, molten solder satisfactorily comes in contact with such a position. This enables the prevention of poor wetting and the enhancement of reliability.

Figure 2A:
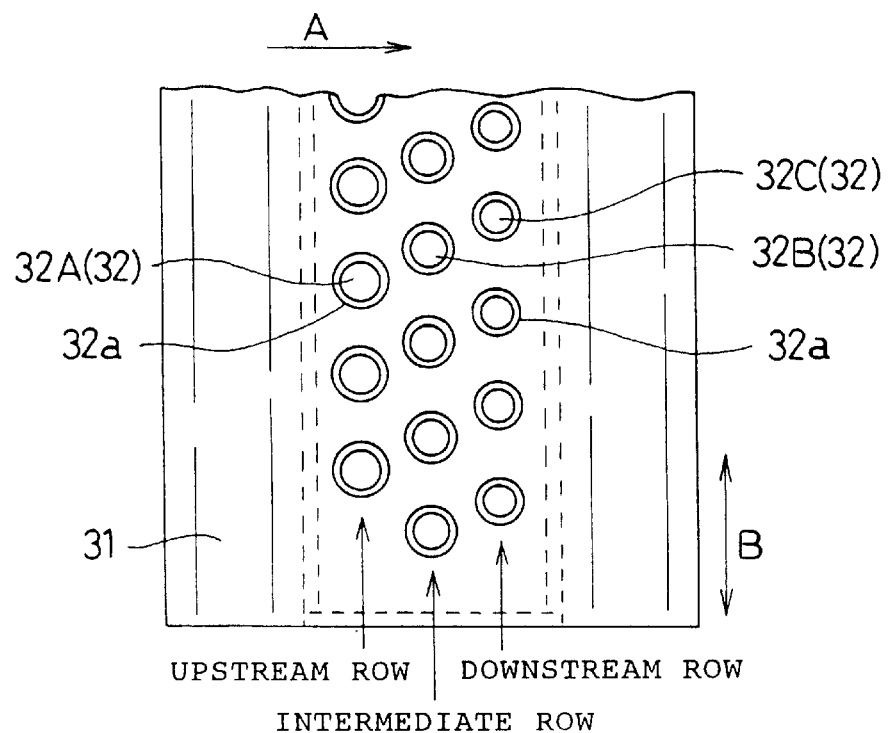
FIGS. 2a and 2b are views in top and in front elevation in section, respectively, partly broken away to show the main part of a jet solder feeding device according to a second embodiment of the present invention.
Figure 2B:
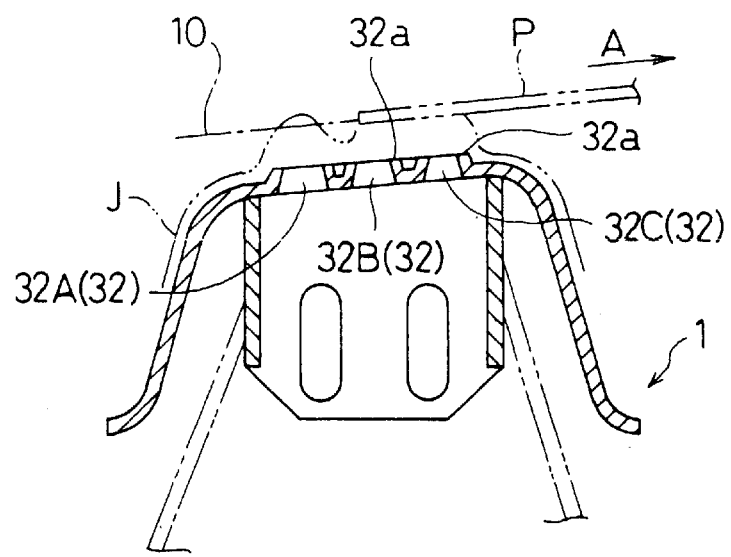
Figure 3:
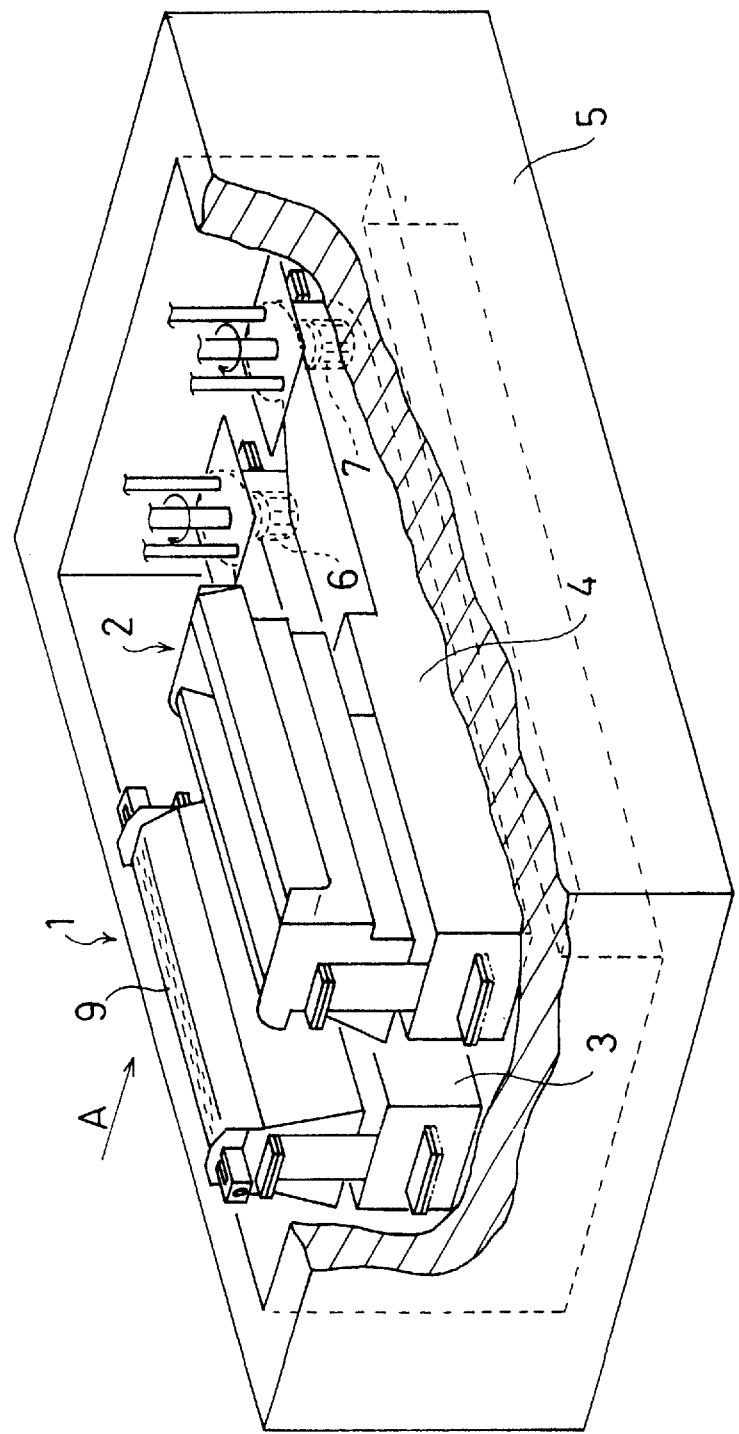
FIG. 3 is a schematic view in perspective of a jet solder feeding device.
Figure 4:
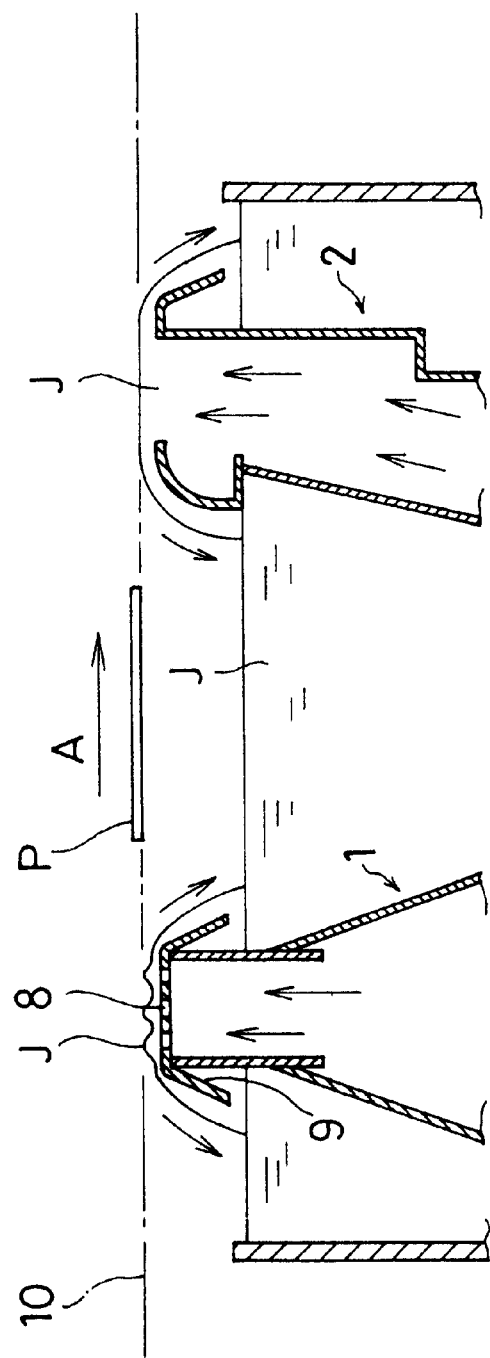
FIG. 4 is a schematic elevational view in section of a jet solder feeding device.
Figure 5A:
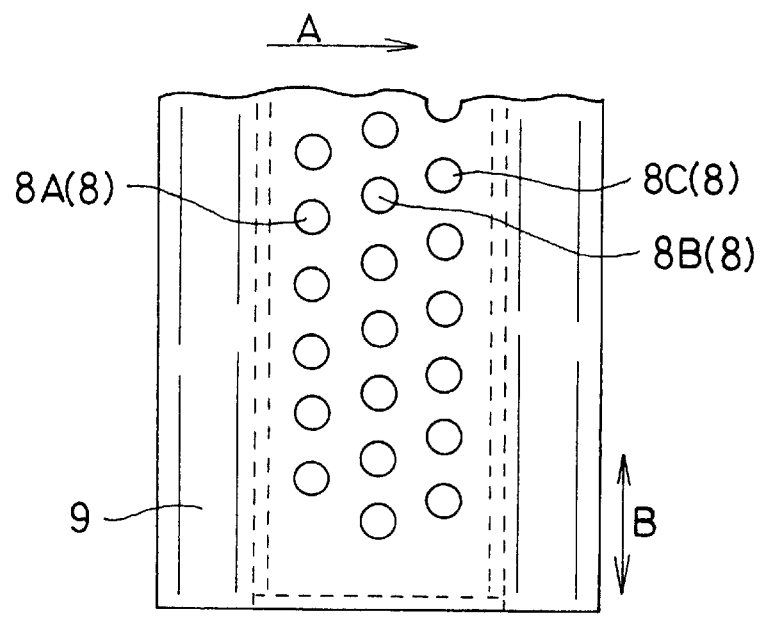
FIGS. 5a and 5b are views in top and in front elevation in section, respectively, partly broken away to show the main part of a jet solder feeding device according to a prior art.
Figure 5B:
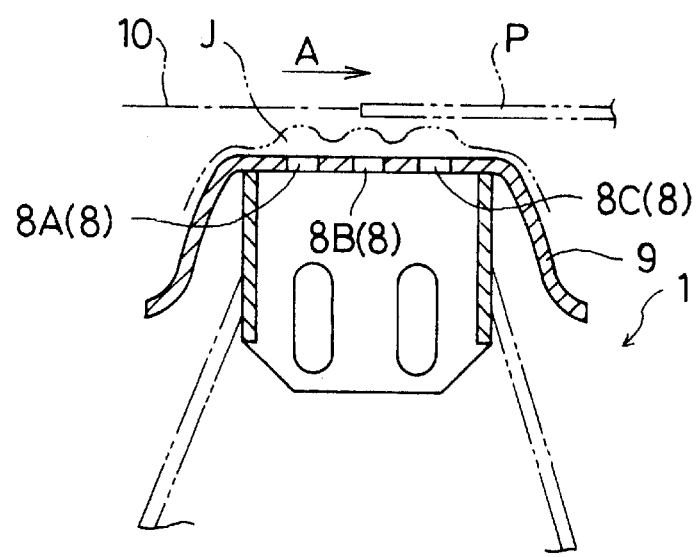

Referring now to FIGS. 2a and 2b, there is shown a main part of a jet solder feeding device according to a second embodiment of the present invention, a substrate P of this embodiment being consolidated with discrete parts as well as surface mounted parts and having a surface with relatively large unevenness. In order to achieve a satisfactory soldering for such a substrate P as has a portion with relatively large unevenness, the direction A in which the substrate P is conveyed and the portion of a corrugated plate 31 on which ejecting ports 32 are formed are sloped in such a manner that they go up toward the downstream side of the substrate-conveying direction A. Further, the ejecting ports 32A, 32B and 32C are arranged in such a manner that their centers are in different locations relative to the direction B perpendicular to the substrate-conveying direction A and are designed in such a manner that the one located nearer to the downstream side of the substrate-conveying direction A has a smaller bore diameter.

The wall portions 32a surrounding each ejecting ports 32 on the corrugated plate 31 are also designed to project upward and are formed by coining or extrusion.

According to this configuration, since the wall portions 32a surrounding each ejecting port 32 are projected upward, molten solder introduced under the corrugated plate 31 is satisfactorily guided by the wall portions 32a surrounding each ejecting port 32 and projected upward; accordingly, the molten solder ejected from the ejecting ports 32 can be kept at a desired height, in addition, its state is satisfactorily maintained in a stable manner. Thus, even when position fluctuations occur on the surface of the substrate P or the electronic parts subjected to soldering, molten solder satisfactorily comes in contact with such a position. This enables the prevention of poor wetting and the enhancement of reliability.

Further, in this configuration, since the portion of the corrugated plate 31 on which the ejecting ports 32 are formed is sloped in such a manner that it goes up toward the downstream side of the substrate-conveying direction A, the molten solder ejected from the ejecting ports 32 on the downstream side C of the substrate-conveying direction A flows down toward the upstream side of the substrate-conveying direction A. However, since the ejecting ports 32A, 32B and 32C are arranged in such a manner that their centers are in different locations relative to the direction B perpendicular to the substrate-conveying direction A and are designed in such a manner that the one located nearer to the downstream side of the substrate-conveying direction A has a smaller bore diameter, it is possible to hold the leveling of the piles of the molten solder ejected from the ejecting ports 32A and 32B on the upstream and intermediate sides by the molten solder ejected from the ejecting ports 32 on the downstream side C to a minimum. Accordingly, even when the substrate P warps to some degree due to the heating by the molten solder, the molten solder ejected from the ejecting ports 32 satisfactorily comes in contact with all surfaces of the substrate P and the electronic parts to be soldered, which enables the prevention of poor wetting. Thus a satisfactory soldering can be achieved for the substrate P which is consolidated with discrete parts as well as surface mounted parts and has a surface with relatively large unevenness.

In the above embodiments, the present invention has been described in which the wall portions 22a and 32a surrounding each of the ejecting ports 22, 32 are projected upward by coining or extrusion. And this advantageously provides a lower production cost. However, it goes without saying that the wall portions 22a and 32a surrounding each of the ejecting ports 22, 32 are projected upward using other processing techniques. The present invention has been described in which the ejecting ports 22 and 32 are arranged in three rows in the direction B perpendicular to the substrate-conveying direction A. It also goes without saying that the present invention is applied to the jet solder feeding device in which ejecting ports are arranged in two rows or four or more rows. The shape of ejecting ports 22 and 32 is not limited to round hole, various shapes such as polygonal, square or rectangular shape may also be adopted. Further, it goes without saying that, if the above structure involving ejecting ports is provided for only part of jet nozzles, the above effect can be obtained right on the part. The present invention is particularly suitable for the solder materials such as tin-copper based solder which contains no lead; however, it is natural that the present invention is applicable to various types solder such as conventional lead-containing solder and the other solder without lead.

As described above, according to the present invention, each of the wall portions surrounding each ejecting port on a corrugated plate is designed to project upward to form a conical surface. This makes it possible to keep the piles of the molten solder ejected from each ejecting port at a desired height in a stable manner, and hence achieving satisfactory soldering.

In addition, since the wall portions surrounding each ejecting port are formed by or extrusion, the formation of the projection becomes easier and the production cost becomes lower.

What is claimed is:

1. A jet solder feeding device, comprising:

a corrugated plate, and ejection ports defined in the corrugated plate, the ports for feeding molten solder to a lower surface of a substrate, the ports having two openings, a solder exit side opening upwardly, and a solder entry side opening downwardly for facing a supply of molten solder, the solder exit opening being smaller in cross-sectional area than the solder entry opening, and the wall between the two openings is a conical surface.

2. The device of claim 1, wherein the walls and exit openings project above an upper surface of the corrugated plate.

3. The device of claim 1, further comprising:

a first nozzle including the ejection ports for feeding molten solder upwardly to a substrate via the ejection ports, and a second nozzle for removing excess solder from a substrate.

4. A method for wave soldering, comprising:

providing a jet solder feeding device comprising
   a first nozzle for feeding molten solder to a substrate via ejection ports, said first nozzle comprising a corrugated plate, and ejection ports defined in the corrugated plate, the ports for feeding molten solder to a lower surface of a substrate, the ports having two openings a solder exit side opening upwardly, and a solder entry side opening downwardly for facing a supply of molten solder, the solder exit opening being smaller in cross-sectional area than the solder entry opening, and the wall between the two openings is a conical surface,
   and a second nozzle for removing excess solder from a substrate;

feeding molten solder through the ejection ports, to the lower surface of a substrate; and removing excess solder from a substrate with second nozzle.

\* \* \* \* \*